United States Patent [19]

Ochiai

[11] Patent Number: 4,516,474
[45] Date of Patent: May 14, 1985

[54] TANDEM DIAPHRAGM BRAKE BOOSTER

[75] Inventor: Chiaki Ochiai, Chiryu, Japan

[73] Assignee: Aisin Seiki Kabushiki Kaisha, Kariya, Japan

[21] Appl. No.: 509,430

[22] Filed: Jun. 30, 1983

[30] Foreign Application Priority Data

Jul. 6, 1982 [JP] Japan .................... 57-102389[U]

[51] Int. Cl.³ ............... F01B 19/00; F15B 9/10
[52] U.S. Cl. ....................... 91/519; 91/533; 60/547.1; 92/48; 92/97; 92/98 R
[58] Field of Search ............... 91/508, 519, 533, 534, 91/536; 92/48, 97, 49, 98 R, 98 D; 60/547.1; 138/30; 277/212 FB, 29; 220/85 B; 74/18.1, 18.2

[56] References Cited

U.S. PATENT DOCUMENTS 2,989,035  6/1961  Stelzer ............................ 92/48
3,805,680  4/1974  Weatherhogg .................. 92/48
4,257,312  3/1981  Ohmi .

FOREIGN PATENT DOCUMENTS 57-3882  1/1982  Japan .
2082275  3/1982  United Kingdom .......... 92/169

Primary Examiner—Robert E. Garrett

Attorney, Agent, or Firm—Oblon, Fisher, Spivak, McClelland & Maier

[57] ABSTRACT

A tandem diaphragm brake booster includes a housing, first and second diaphragms disposed in said housing, a partition wall disposed between said first and second diaphragms within said housing for defining four pressure chambers. The housing is composed of a cup-shaped shell section having a broad cylindrical outer wall and a flange shaped rear shell section. A bead of the first diaphragm is situated between the inner surface of the front sell section and a securing member of the partition wall for defining the first and second chambers. The second diaphragm has inner and outer beads and through-holes at its periphery. The inner bead is compressed between the peripheral edge of the partition wall and the inner surface of the rear shell section and the outer bead is air-tightly secured between both peripheral edges of the front shell section and rear shell section. The partition wall and the second diaphragm define the third chamber and the second diaphragm and the rear shell section define the fourth chamber. The second and fourth chambers are connected through the cylindrical space formed between the inner surface of the cylindrical outer wall of the front shell section and the outer surface of the partition wall and through-holes of the second diaphragm.

5 Claims, 4 Drawing Figures

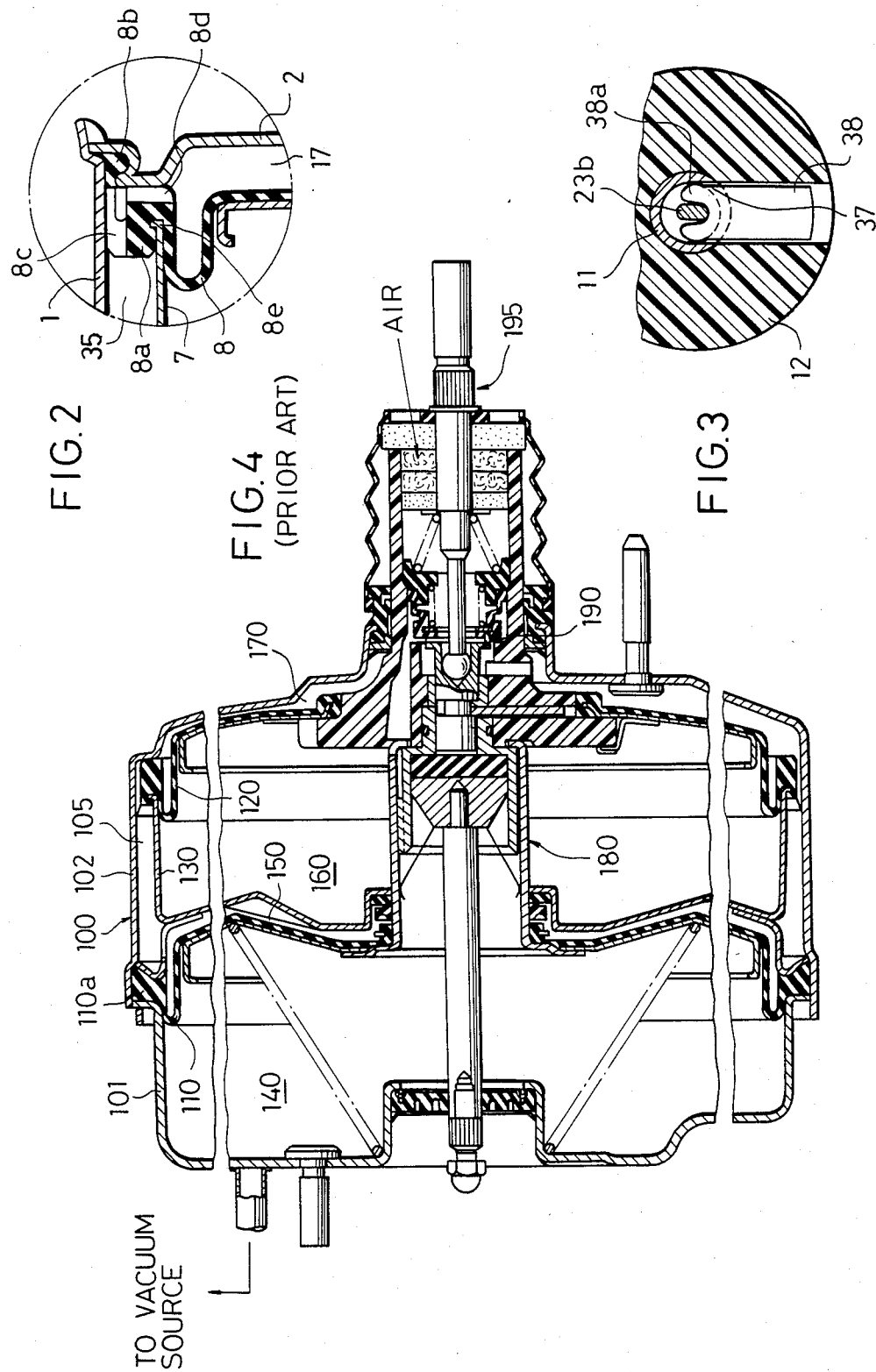

TANDEM DIAPHRAGM BRAKE BOOSTER

BACKGROUND OF THE INVENTION

1. Field of the Invention

This invention relates to brake boosters for vehicles and more particularly to a tandem diaphragm brake booster of the type used in association with a vehicle brake system.

2. Description of the Prior Art

As shown in FIG. 4, one of the typical tandem diaphragm brake boosters includes a housing 100, first and second diaphragms 110, 120 disposed in said housing 100, a partition wall 130 disposed between said first and second diaphragms 110, 120 within said housing 100 for defining first constant pressure chamber 140, first variable pressure chamber 150, second constant pressure chamber 160 and second variable pressure chamber 170, a piston member 180 secured to said first and second diaphragms 110, 120, a valve member 190 disposed in the piston member 180 for generating a pressure differential between the constant pressure chambers 140, 160 and the variable pressure chambers 150, 170 and operator-operated means 195 for actuating said valve member 190 in response to manual operation.

The conventional tandem diaphragm brake boosters are classified into two types in relation to the passage connecting the first variable pressure chamber 150 and second variable pressure chamber 170.

One type of the brake booster has the passage formed within the piston member. This type of the brake booster is described in Japanese published unexamined utility model application No. SHO 57-3882. Usually the piston member is very complicated. Therefore, it is not easy to form the passage within the piston member. The other type of the brake booster is shown in U.S. Pat. No. 4,257,312 and also in the above mentioned Japanese published unexamined utility model application. The brake booster shown in FIG. 4 is one. This type of brake booster has the passage 105 formed between the inner surface of the housing 100 and the cylindrical outer periphery of the partition wall 130. It is relatively easy to make the passage 105. However, this type of brake booster has the following drawbacks. As shown in FIG. 4, a front shell section 101 and a rear shell section 102, which together form the housing 100, are joined together air-tightly with a bead 110a of the first diaphragm 110. Namely, the rear shell section 102 should be shaped in a cup with the cylindrical outer portion so that its volume is increased. Usually the rear shell section 102 is made of a thicker steel plate than the front shell section 101. The resulting brake booster becomes heavy. Further, in winter, when used at a cold area where an anti-freeze agent is spread over the roads, this agent splashes up over the engine room during running of the car, and the connecting part of both shell sections 101, 102 receive said splashing agent actively, so it is feared that rusting and corrosion will occur in said connecting parts due to accumulation of salt components of said agent.

SUMMARY OF THE INVENTION

The present invention has basically solved the foregoing disadvantages in the prior art.

Therefore, one object of the present invention is to improve the housing construction of the brake booster without changing the passage formed between the housing and the cylindrical outer periphery of the partition wall.

Another object of the present invention is to provide a tandem diaphragm brake booster which is easily assembled.

To complete these objects, the tandem diaphragm brake booster of the present invention is constructed as follows:

A cup-shaped front shell section having a broad cylindrical outer wall and a dish shaped rear shell section are employed to form a housing. A bead of a first diaphragm is compressed between the inner surface of the front shell section and a ring shaped securing member of a partition wall. The securing member includes a plurality of through-holes. A second diaphragm is shaped to have two ring shaped beads, i.e. an inner bead and outer bead, at the peripheral part thereof and a plurality of through-holes formed between the two beads. The inner surface of the front shell section and the front side surface of the first diaphragm forms a first constant pressure chamber, and the rear side surface of the first diaphragm and the front side surface of the partition wall forms a first variable pressure chamber. The inner bead of the second diaphragm is compressed between the peripheral edge of the partition wall and the inner surface of the rear shell section and the outer bead of the second diaphragm is air-tightly secured between both peripheral edges of the front shell section and rear shell section. The rear side surface of the partition wall and the front side surface of the second diaphragm form a second constant pressure chamber. The rear side surface of the second diaphragm and the inner surface of the rear shell section form a second variable pressure chamber. The first variable pressure chamber and the second variable pressure chamber are connected through the through-holes of the securing member, the cylindrical space formed between the inner surface of the cylindrical outer wall of the front shell section and the outer surface of the cylindrical wall of the partition wall, and the through-holes of the second diaphragm.

The tandem diaphragm brake booster of the present invention has a passage connecting two variable pressure chambers formed between the inner surface of a housing and the cylindrical outer periphery of a partition wall. Therefore the brake booster is easy to manufacture. Also the connecting portion of the housing is situated at the rear side thereof. This solves the problem of possible corrosion and rusting of the housing. Also the housing is assembled with a large front shell section made of a relatively thin plate and a small rear shell section made of a relatively thick plate. Therefore, the weight of the brake booster is decreased.

BRIEF DESCRIPTION OF THE DRAWINGS

Various other objects, features and attendant advantages of the present invention will be more fully appreciated as the same becomes better understood from the following detailed description when considered in connection with the accompanying drawings.

FIG. 2 is an enlarged view of a portion designated by reference letter E in FIG. 1;

FIG. 3 is a fragmentary cross-sectional view taken along line III—III of FIG. 1;

FIG. 4 is a cross-sectional view of a conventional brake booster;

DETAILED DESCRIPTION OF THE PREFERRED EMBODIMENTS

Figure 1:
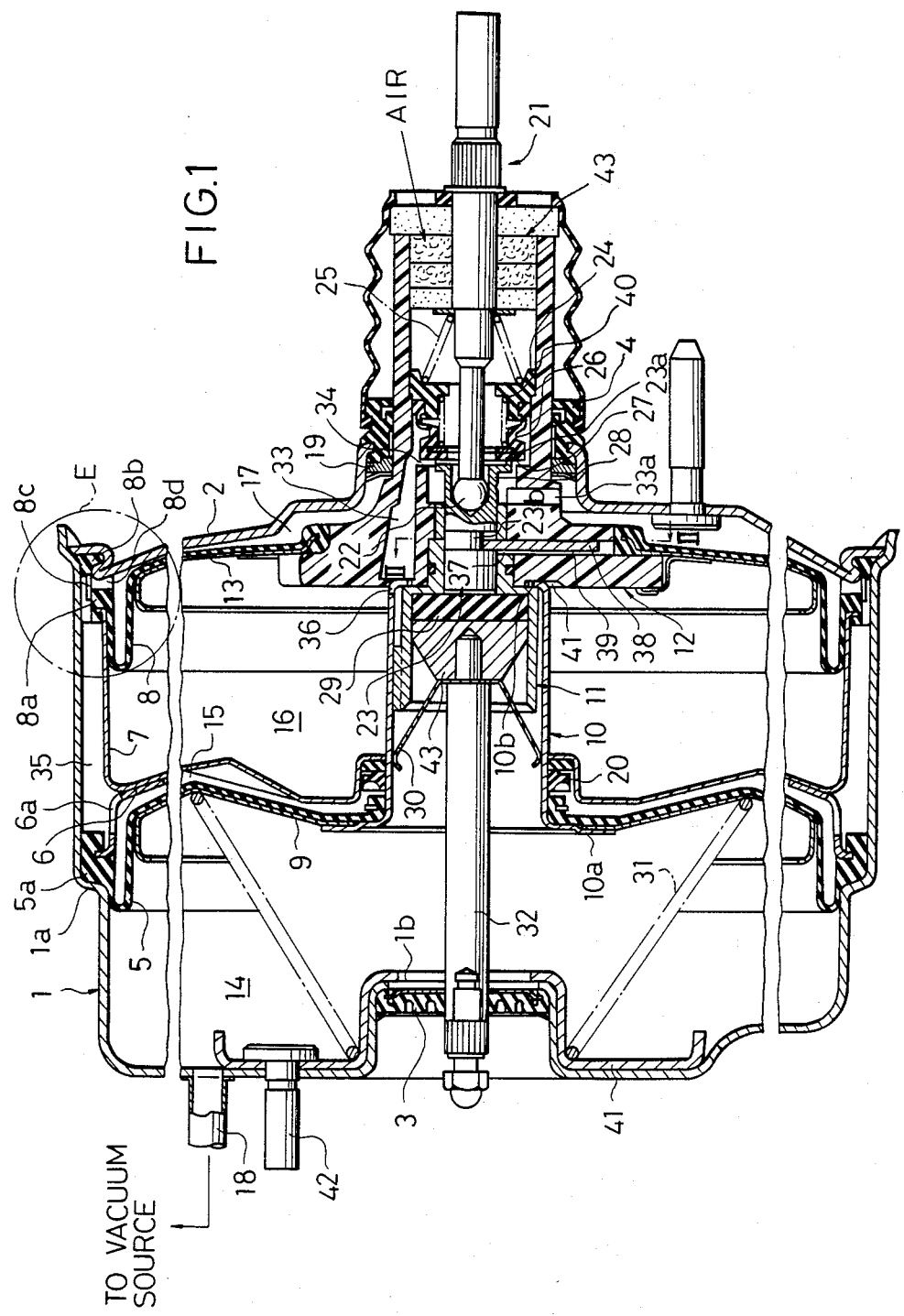
FIG. 1 is a cross-sectional view of a preferred embodiment of the present invention.

Referring now to the drawings, there is shown in FIG. 1 a booster housing formed in front shell section 1 and rear shell section 2.

Front shell section 1 is shaped in a cup with a broad cylindrical outer wall with a ring shaped shoulder portion 1a and is provided with a central opening 1b that includes a seal 3. While rear shell section 2 is dish-shaped and is provided with a similar central opening that include a seal 4 inch serves as a dust boot.

A bead 5a of a first diaphragm 5 is compressed between a ring shaped securing member 6 having a plurality of through-holes 6a, and the inner surface of the shoulder portion 1a of the front shell section 1. Within the front shell section 1 is provided a cup-shaped partition wall 7. The securing member 6 is secured to the front side of the partition wall 7.

A second diaphragm 8, shown in FIG. 2, is provided with two ring shaped beads, inner bead 8a and outer bead 8b at the periphery thereof. A plurality of connecting through holes are provided between the inner bead 8a and the outer bead 8b. Each through hole is composed of a blind longitudinal groove 8c and a lateral groove 8d connected to the longitudinal groove 8c. The inner bead 8a is provided with a front circular groove 8e in which the open end of the partition wall 7 is inserted. The inner surface of the rear shell section 2 pushes the inner bead 8a to the open end of the partition wall 7. The outer bead 8b of the second diaphragm 8 is compressed between the periphery edges of the front shell section 1 and of the rear shell section 2.

The first diaphragm 5 is secured to a first movable wall 9 and a cylindrical member 10 at its inner periphery. The cylindrical member 10 is made of a metal plate and one end 10a thereof is radially outwardly extended and welded to the first movable wall 9. The other end 10b of the cylindrical member 10 is radially inwardly extended to be inserted between a case of casing member 11 and a piston 12. Similarly, the second diaphragm 8 is secured to a second movable wall 13 and the piston 12 at its inner periphery. Thus, the booster housing includes four chambers 14, 15, 16 and 17 formed therein.

The first chamber (first constant pressure chamber) 14 is provided between the inside wall of the front shell section 1 and the first diaphragm 5 and is continuously connected to a vacuum source through port 18. The second chamber (first variable pressure chamber) 15 is provided between the first diaphragm 5 and the partition wall 7. The third chamber (second constant pressure chamber) 16 is provided between the partition wall 7 and the second diaphragm 8 and the fourth chamber (second variable pressure chamber) 17 is provided between the second diaphragm 8 and the shell section 2. Numeral 19 designates a bearing member which movably supports an outer periphery of the piston 12.

A seal 4 is also supported on the bearing 19 for airtightly engaging with the outer periphery of the piston 12. A seal member 20 is provided between the partition wall 7 and the outer periphery of the cylindrical member 10 for providing a sealing function therebetween.

A connecting rod 21, extending outwardly from the piston 12, is operatively connected to a brake pedal or the like (not shown) for operating the booster upon axial movement thereof. The inner end of the rod 21 is provided with a ball head 22 operatively engaged with a plunger 23. A disk-like plate 24 is provided within the piston 12 and is biased to the left by a spring 25. The disk-like plate 24 includes a seal member 26, the inner face of which serves as a valve seat 27 of an air valve 28. The valve seat 27 is in sealing contact with one end surface 23a of the plunger 23. The case member 11 is disposed in a bore of the cylindrical member 10 and a bore of the piston 10. The plunger 23 is disposed in a reduced diameter portion of the case member 11

A reaction member 29 made of an elastic material, such as rubber, is disposed in the large diameter portion of the case member 11. A spring 31 is disposed between the cylindrical member 10 and reinforcing plate 41 in the first chamber 14 for biasing the cylindrical member 10 toward the piston 12. The reinforcing plate 41 is set up to the end wall of the front shell section 1, to which a bolt 42 for fixing of the master cylinder.

A push rod 32 is operatively connected at its one end to a master cylinder piston (not shown) and at its other end to a member 43 slidably disposed in the casing member 11. A passage 33 is provided in the piston 12 for connecting the third chamber 16 with the fourth chamber 17, through a passage 33a and a gap 34 between the inside wall of the piston 12 and the valve seat 27 of the air valve 28. The fourth chamber 17 is in fluid communication with the second chamber 15 through passage 35. The passage 35 includes the through-holes 6a of the securing member 6, a cylindrical space formed between the cylindrical wall of the front shell section 1 and the partition wall 7 and the connecting through-holes of the second diaphragm 8.

The first and third chambers 14 and 16 are in fluid communication with each other through passage 36 provided on the cylindrical member 10. The case member 11 includes recess 37 in which a fork-type key 38 is disposed. The key 38 is also inserted into a recess 39 provided in the piston 12. A fork portion 38a of the key 38 receives a reduced diameter portion 23b of the plunger 23, as is best shown in FIG. 3.

The reduced diameter portion 23b of the plunger 23 is designed to have a sufficient length so that the plunger 23 is axially movable for accomplishing the valve opening and closing operations. The fork portion of the key member 38 restricts further axial movement of the plunger 23 by abutting the shoulders of the large diameter portions of the plunger 23. The inward extending end 10b of the cylindrical member 10 is retained between the case member 11 and the piston 12 by the key member 38 such that extending end 10b is inserted between the piston 12 and the case member 11.

In operation, when the rod 21 operated by the brake pedal is moved to the left, the plunger 23 is moved to the left. Simultaneously, the seal member 26 is moved to the left by the biasing force of a spring 40, maintaining the valve seat 27 of the seal member 26 in contact with the right end 23b of the plunger 23. This leftward movement of the seal member 26 is prevented when the valve seat 27 is engaged with the inner wall of the piston 12 to interrupt communication between the third and fourth chamber 16 and 17.

Further leftward movement of the plunger 23 will release the engagement between the valve seat 27 and the right end 23b of the plunger 23 to thereby introduce air into the fourth chamber 17 from the open end of the piston 12 through air filters 43 and passage 33a. The air introduced into the fourth chamber 17 is further introduced into the second chamber 15 through passage 35. The pressure differentials will then prevail between the first and second chambers 14 and 15 and third and fourth chambers 16 and 17, respectively. Therefore, the cylindrical member and pistons 10 and 12, respectively secured to the respective first and second diaphragms 5, 8 initiate movement to the left due to such pressure differentials.

The case member 11, which is keyed to the piston 12, is also moved to the left to move the push rod 32 of the master cylinder, to thereby cause the master cylinder to generate brake pressure for brake operation. Reaction pressure on the rod 32 will deform the elastic reaction member 29 to abut plunger 23, providing a reaction which opposes the valve opening movement of the rod 21. After a desired braking effort is achieved, forward (leftward) movement of the rod 21 is stopped, following which the right end of the plunger 23 engages with the valve seat 27, thereby preventing further air flow into the fourth chamber 17.

When it is desired to reduce the force generated by the booster, the force applied to the rod 21 is reduced whereupon the reaction member 29 and spring 25 cause the plunger 23 to bias the valve seat 27 out of engagement with the inner side wall of the piston 12 and so reduce the pressure in the fourth and second chambers 17, 15, and complete removal of the force of the rod 21 permits the air valve 27 to assume the position shown in FIG. 1 to equalize the vacuum in all four chambers 14, 15, 16 and 17.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A tandem diaphragm brake booster which comprises:
   a housing;
   first and second diaphragms disposed in said housing in spaced relation to each other;
   a partition wall disposed between said first and second diaphragms within said housing for defining first, second, third and fourth chambers within said housing;
   a securing member interconnecting said partition wall with said housing;
   piston means secured to said first and second diaphragms and axially slidable therewith;
   first fluid passage means provided in said piston means for fluid communication between said first and third chambers, said first chamber being in communication with a vacuum source;
   second fluid passage means provided between said housing, and said partition wall for fluid communication between said second and fourth chamber;
   third fluid passage means provided in said piston means for fluid communication between said third and fourth chambers;
   valve means disposed in said third fluid passage means for preventing fluid communication between said third and fourth chambers and introducing atmospheric pressure into said fourth chamber, thereby creating pressure differentials between said first and second chambers and said third and fourth chambers, respectively; and
   operator-operated means for actuating said valve means in response to manual operation;
   wherein said housing further comprises a first shell section having a cylindrical outer wall with a shoulder portion and a second dish-shaped shell section;
   said first diaphragm has a bead at its periphery and said bead of the first diaphragm is compressed between said shoulder portion of the first shell section and said securing member; and
   said second diaphragm has an inner bead and an outer bead at its periphery and fourth fluid passage means provided between said inner bead and said outer bead and wherein said inner bead is secured air-tightly to said partition wall and said outer bead is compressed between said first shell section and said second shell section.

2. A tandem diaphragm brake booster of claim 1, wherein said first shell section is made of a thinner metal plate than a metal plate forming said second shell section.

3. A tandem diaphragm booster according to claim 1, wherein said inner and outer beads of said second diaphragm are ring shaped, and said fourth fluid passage means further comprises a plurality of connecting through holes provided between said beads.

4. A tandem diaphragm brake booster according to claim 3, wherein each of said through holes further comprises a blind longitudinal groove and a lateral groove connected to said longitudinal groove.

5. A tandem diaphragm brake booster according to claim 3, wherein said inner bead is provided with a front circular groove in which the open end of said partition wall is inserted, and the inner surface of said second shelf section pushes said inner bead to an open end of said partition wall.

* * * * *